March 17, 1936.  R. M. NARDONE  2,034,150
AUTOMATIC TRANSMISSION
Filed June 6, 1934  3 Sheets-Sheet 1

INVENTOR.
Romeo M. Nardone
BY Warren T. Hunt
ATTORNEY.

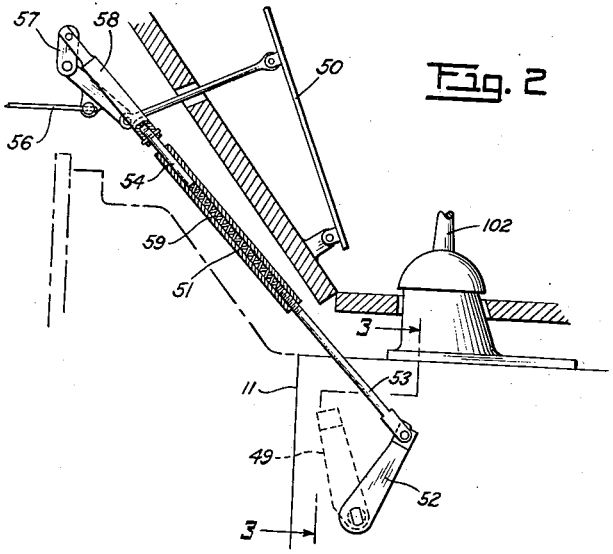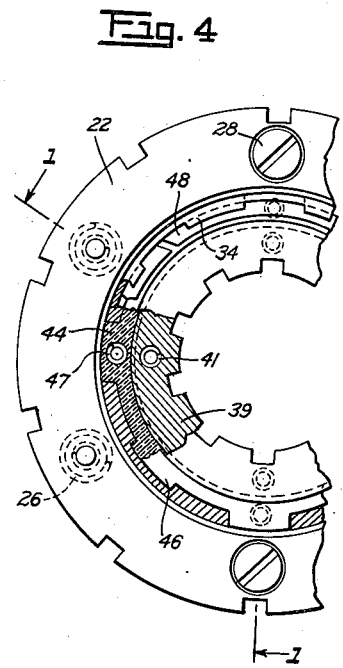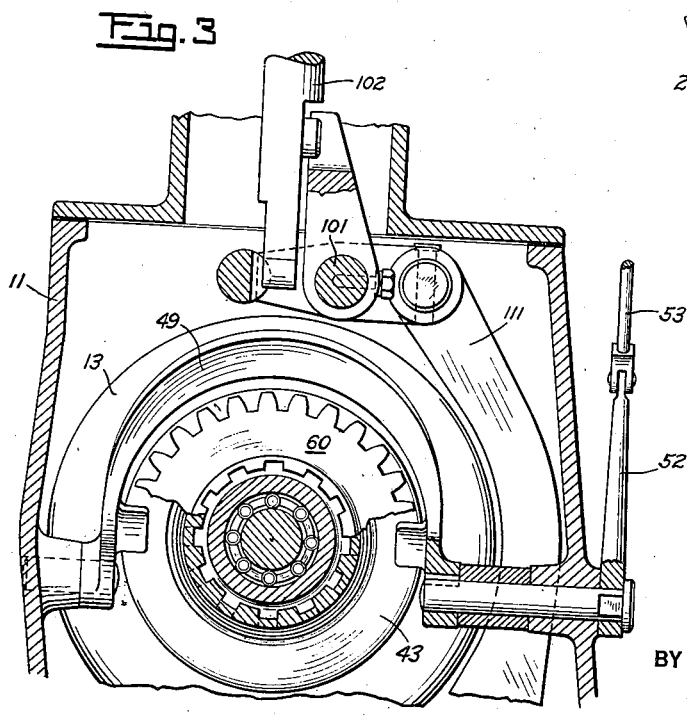

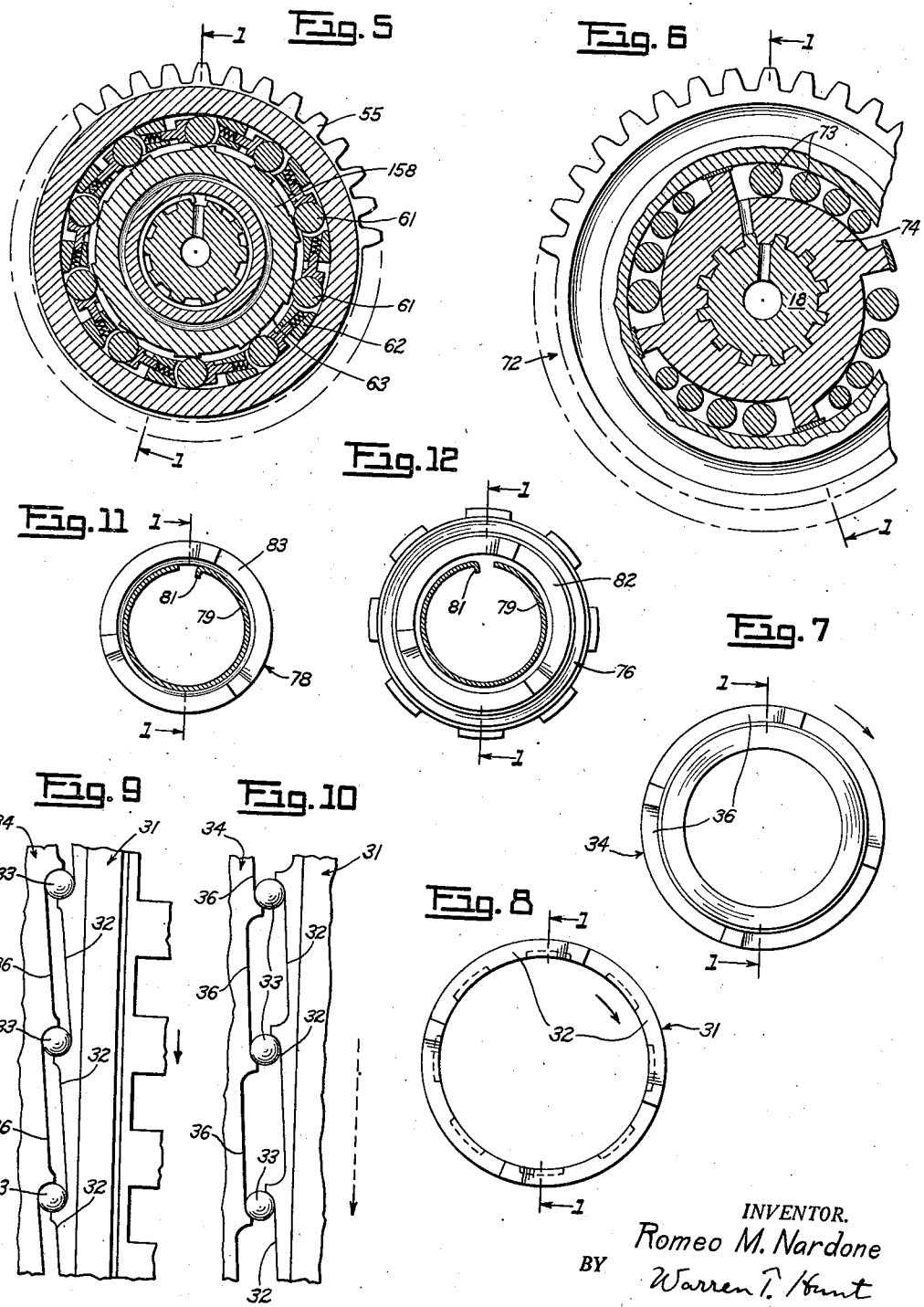

Patented Mar. 17, 1936

2,034,150

UNITED STATES PATENT OFFICE 2,034,150

AUTOMATIC TRANSMISSION

Romeo M. Nardone, East Orange, N. J., assignor to Eclipse Aviation Corporation, East Orange, N. J., a corporation of New Jersey Application June 6, 1934, Serial No. 729,301

20 Claims. (Cl. 74—336)

This invention relates to transmission mechanism and more particularly to automatic variable speed mechanisms such as are ordinarily used in connection with automotive vehicles.

The present application is an improvement on copending joint application, Serial No. 646,330, filed December 8, 1932.

An object of the present invention is to simplify the structure disclosed in application No. 646,330 by the elimination of the threaded screw shaft used in that application in connection with the intermediate speed gear.

Another object of the invention is to eliminate sudden engagement of the high speed friction clutch in changing from intermediate gear to high gear.

Another object of the invention is to provide an automatic variable speed transmission having a friction clutch in which means are provided for quickly disengaging the clutch upon slippage thereof.

Another object of the invention is to provide an automatic throwout mechanism for the high speed friction clutch.

Another object of the invention is to provide an automatic transmission with a novel cam mechanism for disengaging the high speed gear ratio driving means.

Another object of the invention is to provide a transmission of the speed and torque controlled type in which the usual threaded sleeves of the intermediate gear trains are eliminated.

Other objects and features of the invention will be apparent from the following description in connection with which a preferred embodiment of the invention has been illustrated in the accompanying drawings in which:

Fig. 2 is a view partly in section illustrating the interconnection of the high speed clutch control with the vehicle engine throttle;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 6 is a sectional view taken on line 6—6 of Fig. 1;

Fig. 7 is an end view of one of the high speed clutch disengaging cams taken on the line 7—7;

Fig. 8 is a view of the other high speed clutch disengaging cam taken along the line 8—8 of Fig. 1;

Figs. 9 and 10 are development views of the cams shown in Figs. 7 and 8. Fig. 9 shows the position of the cams when the high speed clutch is engaged and Fig. 10 shows the position of the cams when the clutch is disengaged;

Fig. 11 is an end view of one of the intermediate speed disengaging cams taken on line 11—11 of Fig. 1; and Fig. 12 is an end view of the other intermediate speed disengaging cam taken on line 12—12 of Fig. 1.

Figure 1:
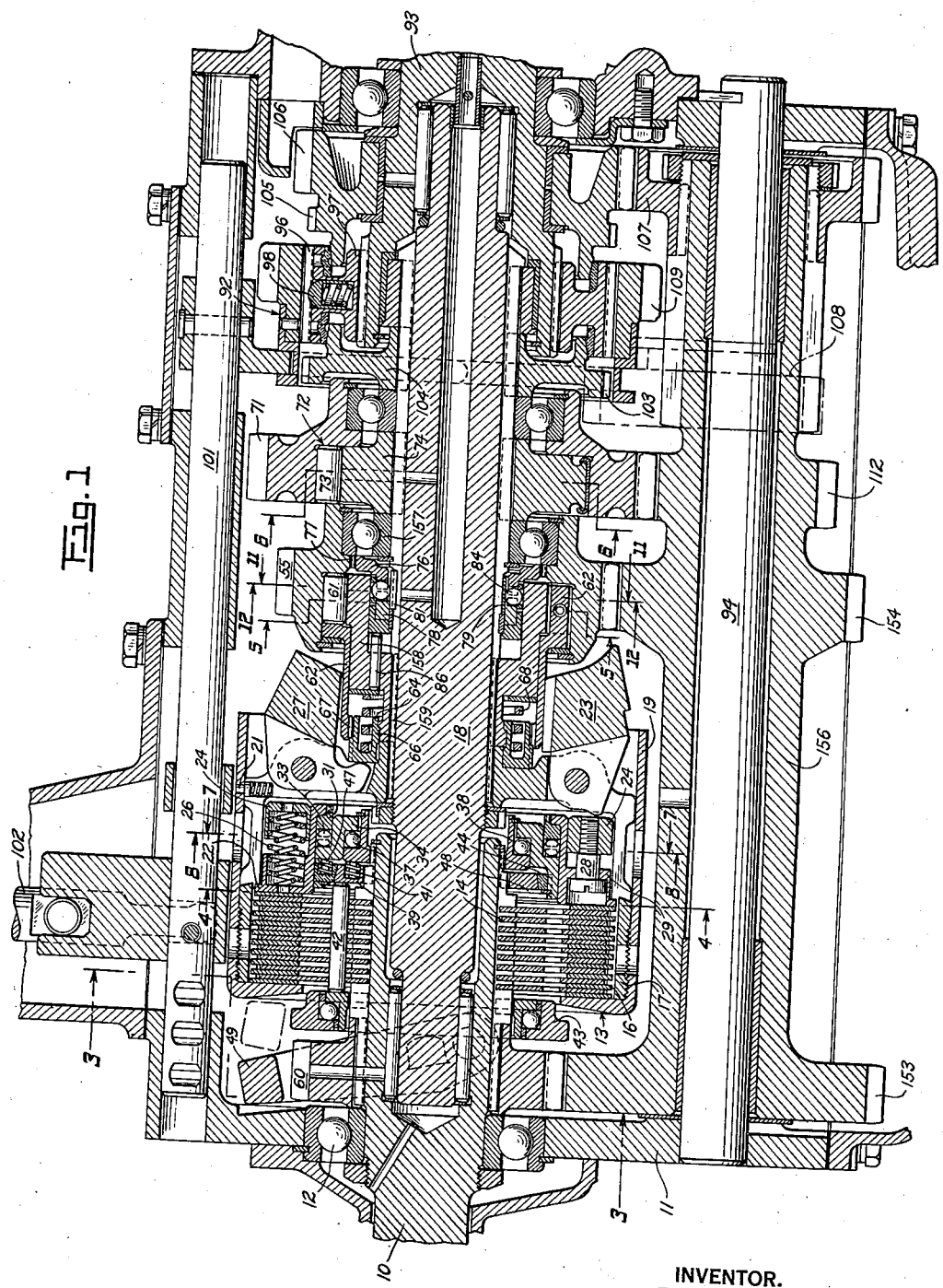
Fig. 1 is a sectional elevation of the improved transmission.

Referring to the drawings, the transmission is shown in Fig. 1 in the neutral position and with the centrifugal weights in the position they normally occupy when the engine is at rest. The driving shaft 10 which is adapted to be connected to the vehicle engine (not shown) is rotatably mounted in transmission casing 11 by bearing 12, and carries the high speed clutch generally designated by 13. The clutch includes a set of driving plates 14 which are splined to the driving shaft 10 and a set of driven plates 16 which are interposed between the driving plates and splined to the clutch barrel 17 which is keyed to driven shaft 18 and threaded into the clutch housing 19 wherein it is held by spring pressed lock member 21 engaging within an opening in the housing. The plates 14 and 16 are adapted to be pressed into driving contact by a pressure plate 22, that is splined to the barrel and movable toward the plates by the outward movement of centrifugal weights 23 which have cam surfaces bearing against slidable ring member 24. Springs 26 are interposed between ring member 24 and the pressure plate 22 whereby movement of the member toward the left (as viewed in Fig. 1) by outward movement of the weights will compress the springs and cause the pressure plate to clamp the discs 14 and 16 into frictional engagement.

It is preferred to use three or more weights 23 between which are interposed other weights 27, the purpose of which is to control the second speed gear in a manner to be hereinafter described. All weights are pivotally mounted on clutch barrel 17 and have their outward movement limited by the housing 19. Clutch springs 26 are so selected that when the weights 23 have moved to their outermost position the pressure upon the discs 14 and 16 will be sufficient to cause them to transmit the maximum torque delivered by driving shaft 10. Movement of ring member 24 toward the weights is limited by screws 28, the heads of which engage flange 29 of the pressure plate 22. A plurality of springs 26 and screws 28 are used, and they are distributed about the periphery of the clutch 13. A cam member 31 which is splined to the pressure plate 22, has a plurality of face cams 32 coacting through balls 33 with a second cam member 34 having cam faces 36, to disengage the clutch as is hereinafter more fully explained.

Cam 34 is rotatable with respect to driving shaft 10 by reason of bearing 37, the inner race 38 of which is slidably splined to shaft 10. A friction cone 39 is also splined to shaft 10 which is normally urged toward the left, as viewed in Fig. 1, by springs 41 which coact with race 38 to urge the cone against pins 42 which are slidable through the clutch plates by bearing 43 to press the cone 39 into frictional engagement with cone 44 splined to cam 34 as shown at 46 in Fig. 4. Cone 44 is urged toward the left by springs 47, the movement being limited by lock ring 48. Thrust bearing 43 is movable to effect the engagement and disengagement of cones 39 and 44 by a yoke 49 pivotally mounted in casing 11 and interconnected with the engine throttle control or accelerator 50 by lever 52 and rod 53, upon which is threaded a sleeve 51 within which is a slidable rod 54 operatively connected to the throttle control rod 56 by link 57 and connection 58. A spring 59 is interposed between rods 53 and 54 which is of sufficient strength to cause movement of rod 53 to force pins 42 toward the right as viewed in Fig. 1 and overcome the force of springs 41 whereby the cones 39 and 44 are moved into frictional contact.

The assembly comprising pressure plate 22, cams 31 and 34 and bearing 38 is movable toward the right to relieve the pressure on the clutch plates 14 and 16, but spring 59 is more easily compressed than springs 26 and no movement of the pressure plate 22 occurs until connection 58 contacts the end of sleeve 51. Further movement of accelerator pedal 50 after the connection has butted the sleeve will be positively transmitted through yoke 49 and pins 42 to compress springs 26 to relieve the pressure on the clutch plates below that required to transmit the engine torque, the purpose of which will be hereinafter explained.

The second or intermediate speed gear 55, which is driven from the gear 60 secured to shaft 10 and by gears 153 and 154 mounted on the countershaft 156, is rotatably mounted on driven shaft 18 by bearing 157 and is connected to the driven shaft through a one way clutch which is best viewed in Fig. 5. The gear hub 158 is keyed to the driven shaft at 159 and has a plurality of cams formed thereon which cooperate with rollers 61 to cause the gear 55 to drive the shaft 18 in a clockwise direction but permit the shaft to overrun the gear in the same direction.

Means are provided for rendering the overrunning clutch inoperative to drive the shaft 18 which comprises a cage 62 adapted to be rotated and move the rollers 61 in a counter-clockwise direction to the relieved portions 63 between the cams. Rotation of cage 62 is obtained by sleeve 64 which has a threaded connection with hub 158 at 66 and a helical toothed engagement with the cage at 67. Sleeve 64 is urged toward the left, as viewed in Fig. 1, to rotate the cage in a counter-clockwise direction to the inoperative position and is urged toward the right by weights 27 to rotate the cage clockwise to the operative overrunning position shown in Figs. 1 and 6. Weights 27 and spring 68 are so selected that when the shaft 18 is running at a speed corresponding to slow speed of the vehicle (not shown), for example, five (5) miles per hour, the weights are depressed and the cage is rotated to the inoperative position shown in the drawings, but at all speeds above idling speed the overrunning clutch is in the engaged position.

First speed gear 71 is connected to driving shaft 18 by an overrunning clutch 72 which is best seen in Fig. 6, wherein rollers 73 are adapted to be wedged in between gear hub 74 and the gear, when gear 71 is rotated in a clockwise direction, as viewed in Fig. 6, but permit shaft 18 to overrun the gear in the same direction.

Means for disengaging the second speed overrunning clutch while the first speed gears are in operation are provided, which comprises cam member 76 having a toothed connection 77 with second speed gear 55, and a cooperating cam member 78 frictionally connected with the shaft 18 by spring ring 79 which has an internal flange 81 for securing it to the driven shaft 18 and is adapted to be expanded by a clockwise movement of the second speed gear 55 relative to the driven shaft 18. Cam members 76 and 78 are provided with cam surfaces 82 and 83 between which are interposed balls 84, the relationship being such that relative rotation of the second speed gear 55 with respect to the shaft 18 causes a separation of the cam members in much the same manner as has been described for the high speed clutch. Separation of the cam members causes member 66 to be pushed toward the left, as viewed in Fig. 1, by pin 86 to the position shown in Fig. 1, wherein weights 27 are depressed and cage 62 rotates the second speed overrunning clutch to a neutral position with the rollers resting in between the adjacent cam 63 formed on the second speed gear hub. A clutch member 92, which is shown in Fig. 1 as in the neutral position, is provided for engaging shaft 18 with the propeller shaft 93. Two engaging positions are provided for forward drive, one of which is for the automatic operation in the transmission and the other of which is for directly connecting the propeller shaft 93 with the countershaft 94 in the positive gear drive, whereby the engine may be used as a brake in descending a hill. Coupling member 92 is slidably splined at 96 to hub 97 which in turn is splined to propeller shaft 93 and has a slight axial movement with relation thereto. A resilient detent 98 normally holds coupling member 92 in the central position, but permits the member to be moved in either direction when sufficient force is applied to the shift rod 101 by manual operation of lever 102. Movement of coupling member 92 toward the left, as viewed in Fig. 1, causes splines 96 to engage teeth 103 of the member 104 which is secured to the driven shaft 18. In this position of the coupling member, the transmission is in the automatic forward speed position and movement of coupling member 92 toward the right as viewed in Fig. 1 causes splines 96 to mesh with teeth 105 of the positive second speed gear 106, which is in mesh with gear 107 secured to countershaft 94. The reverse drive may be obtained by a movement of reverse idler 108 toward the right, as viewed in Fig. 1, until the teeth of the gear mesh with teeth 109 of the coupling member 92 which for the reverse drive position is positioned as shown in Fig. 1. Operation of the reverse idler 108 is obtained by arm 111 which is adapted to be moved by the manually operable lever 102. The operation of the transmission is as follows:

Assuming that the vehicle engine (not shown) is running and connected to driving shaft 10, coupling member 92 is moved toward the left to connect driven shaft 18 with propeller shaft 93, which is adapted to be connected to the rear wheels of the vehicle. The accelerator pedal 50 is depressed slightly which rocks link 57 clockwise, as viewed in Fig. 2, compresses spring 59 and causes yoke 49 to be rotated in a clockwise direction and pushes cone 39 to engage cone 44. As the engine is rotating slowly, the high speed centrifugal clutch 13 will slip slightly and cause cam members 31 and 34 to move relatively to each other, and move pressure plate 22 toward the right to completely disengage the high speed clutch. Threaded member 66 will be in the position shown in Fig. 1, because weights 27 will not have sufficient centrifugal force to overcome the spring 68, and cage 62 will have moved the second speed overrunning clutch in an inoperative position. The vehicle will then move forward in the low speed gear and the propeller shaft 93 will be driven through gears 60, 153, 112 and 71.

Second speed gear

After the vehicle gains speed in first gear, the accelerator 50 is momentarily released, whereupon shaft 18 overruns the second speed gear 55 because of the overrunning clutch connection and spring 68 returns cam members 76 and 78 to a position wherein the balls contact the low portions of each cam. The second speed overrunning clutch may then be positioned to a forward driving position if the centrifugal force of weights 27 is great enough and they will force threaded member 66 toward the right and rotate cage 62 to position the second speed overrunning clutch in a driving position. When the throttle is again opened, the propeller shaft 93 is driven in the second or intermediate gear by means of gears 60, 153, 154 and 55. The speed of the vehicle is again increased and the accelerator pedal 50 is completely released, whereupon cone 39 is moved out of contact with cone 44 and as in this position of the cones the cam 34 is free to rotate relative to cam 31, the springs 26 return them to their original position, wherein pressure plate 22 acts to force the high speed clutch plates into contact. When the accelerator pedal 50 is again operated to open the throttle, weights 23 fly outwardly and shaft 18 is driven at engine shaft speed, it being understood that shaft 18 will now overrun both the first and second speed gears because of the overrunning clutch connections in each of those gears.

Gear change from high to second upon an increase in load

If the load on driven shaft 18 should increase to a point where the high speed clutch is unable to transmit the full engine torque because of the reduced centrifugal force of weights 23, the clutch plates 16 will slip relative to each other, and if the accelerator 50 is retained in a depressed position, cone 44 is frictionally connected to the driving shaft and relative movement of the clutch parts will cause cam 34 to move relatively to cam 31 to relieve the pressure upon plate 22 and completely release the clutch. As the high speed clutch 13 has been revolving at a comparatively high speed, weights 27 will have positioned cage 62 to the driving position of the second speed gear clutch and the drive will then be resumed by the second speed gear 55.

First speed gear at increased load

If the load on shaft 18 should increase still further and car speed falls, if it is desired to engage the low speed gear, the accelerator pedal 50 is released, whereupon spring 68 forces weights 27 to their inner position and sleeve 64 rotates cage 62 to completely disengage the second speed gear overrunning clutch. Upon opening of the throttle by means of accelerator pedal 50, the second speed gear 55 is driven at a faster rate than shaft 18 and cam members 78 and 76 are forced apart and positively hold the sleeve 64 in the position shown in Fig. 1. The drive from engine shaft 10 is then by means of gears 60, 153, 112 and 71.

The second speed gear drive may be obtained at any time that it is desired by a full depression of the accelerator pedal 50 which causes rod 58 to contact with sleeve 51 and rotate yoke 49 in a clockwise direction. This movement of the yoke forces pins 42 toward the right and moves the entire assembly of cams 34 and 31 against the shoulder of pressure plate 22, whereupon the pressure upon the clutch plates 16 is relieved sufficiently to permit a relative rotation between them, which causes cams 34 and 31 to move relatively to each other and positively engage the high speed clutch. Disengagement of the high speed clutch permits the drive to be transmitted through the second speed gear 55. A complete release of the accelerator pedal 50 will separate cones 39 and 44 and disconnect cam 34 from the driving shaft. Spring 26 will then return the high speed disengaging cams to their normal position, wherein the high speed clutch may be reengaged upon a depression of the accelerator pedal 50 to open the throttle. It will be observed that the transmission shown and described is automatic in its operation and at all times is under the control of the operator by means of the accelerator pedal.

While a preferred embodiment of the invention has been illustrated and described, it is understood that this showing and description are illustrative only and that the invention is not regarded as limited to the form shown and described, or otherwise, except by the terms of the following claims:

What is claimed is:

1. An automatic variable speed transmission comprising a driving shaft, a driven shaft, a friction clutch having driving and driven members for connecting the shafts in a high speed ratio, means for connecting the shafts around the clutch in a lower speed ratio including an over-running device, and means mounted in the clutch and associated with the driving and driven members for disengaging the clutch, said disengaging means being operated by relative rotation of the clutch members.

2. An automatic variable speed transmission comprising a driving shaft, a driven shaft, a friction clutch having driving and driven friction members for connecting the shafts in a high speed ratio, means for connecting the shafts around the clutch in a lower speed ratio including an over-running device, and a pair of relatively rotatable cam members cooperative with the friction clutch to disengage the same, one of said cam members being operatively connected with one of said shafts, and the other of said cam members being connected with the other shaft for disengaging the clutch upon relative rotation of its friction members.

3. An automatic variable speed transmission comprising a driving shaft, a driven shaft, a friction clutch having driving and driven members for connecting the shafts in a high speed ratio, means for connecting the shafts around the clutch in a lower speed ratio including an over-running clutch, spring means for pressing the members into engagement, and a pair of relatively rotatable and axially movable cam members operatively connected with the driving and driven shafts respectively, one of said cam members being arranged to compress the spring means and overcome the force of the spring means upon relative rotation of the cam members by the driving and driven members.

4. An automatic variable speed transmission comprising a driving shaft, a driven shaft, a friction clutch having driving and driven members for connecting the shafts in a high speed ratio, means for connecting the shafts around the clutch in a lower speed ratio including an overrunning clutch, and a pair of relatively rotatable and axially movable cam members, one of which is operatively connected with one of said shafts, manually operable means for connecting the second cam member to the second shaft, and means operated by the cam members arranged to disengage the clutch when the second shaft causes the second cam member to overrun the other cam member.

5. An automatic variable speed transmission comprising a driving shaft, a driven shaft, a friction clutch having driving and driven members for connecting the shafts in a high speed ratio, means for connecting the shafts around the clutch in a lower speed ratio including an overrunning clutch, a spring pressed pressure plate for engaging the members, speed responsive means acting upon the pressure plate through the spring means, and a pair of relatively rotatable and axially movable cam members operatively connected with the driving and driven shafts respectively, one of said cam members being operatively connected with the pressure plate for forcing the pressure plate out of contact with the clutch members upon relative rotation of the cam members.

6. An automatic variable speed transmission comprising a driving shaft, a driven shaft, a friction clutch having driving and driven members for connecting the shafts in a high speed ratio, means including a gear train and an overrunning clutch for connecting the shafts in a lower speed ratio, a pressure plate for the clutch members, centrifugal weights for controlling the pressure plate, spring means interposed between the weights and the pressure plate, a pair of relatively rotatable and axially movable cam members operatively connected with the driving and driven shafts respectively, one of said cam members being operatively connected with the pressure plate to move the same toward the weights upon relative rotation of the cam members, and additional centrifugal weights mounted on the friction clutch for controlling the overrunning clutch.

7. An automatic variable speed transmission comprising a driving shaft, a driven shaft, a friction clutch having driving and driven members for connecting the shafts in a high speed ratio, means including a gear train and an overrunning clutch for connecting the shafts in an intermediate speed ratio, a pressure plate for the clutch members, centrifugal weights for controlling the pressure plate, spring means interposed between the weights and the pressure plate, a pair of relatively rotatable and axially movable cam members operatively connected with the driving and driven shafts respectively, one of said cam members being operatively connected with the pressure plate to move the same toward the weights upon relative rotation of the cam members, additional centrifugal weights mounted on the friction clutch for controlling the overrunning clutch, means including a gear train and an overrunning clutch for connecting the shafts in a low speed ratio, and means associated with both the low and intermediate speed ratio means for depressing all of the weights when the low speed gear means is in operation.

8. An automatic variable speed transmission comprising a driving shaft, a driven shaft, a friction clutch having driving and driven members for connecting the shafts in a high speed ratio, means including a gear train and an overrunning clutch for connecting the shafts in an intermediate speed ratio, a pressure plate for the clutch members, centrifugal weights for controlling the pressure plate, spring means interposed between the weights and the pressure plate, a pair of relatively rotatable and axially movable cam members operatively connected with the driving and driven shafts respectively, one of said cam members being operatively connected with the pressure plate to move the same toward the weights upon relative rotation of the cam members, additional centrifugal weights mounted on the friction clutch for controlling the overrunning clutch, means including a gear train and an overrunning clutch for connecting the shafts in a low gear ratio, coacting cam members operatively connected with the low and intermediate gear means respectively and movable upon relative rotation thereof, said cam members being arranged to depress all of the weights when the low speed gear means is in driving operation.

9. An automatic transmission comprising a driving shaft, a driven shaft, a friction clutch having driving and driven members for connecting the shafts in a high speed ratio, a pressure plate contacting the clutch members, centrifugal weights for urging the pressure plate against the clutch members, spring means interposed between the weights and pressure plate, a pair of relatively rotatable and axially movable cam members operatively connected with the driving and driven shafts one of said cam members being operatively connected with the pressure plate and arranged to move the pressure plate away from the members, when the driving shaft overruns the driven shaft, a gear train for connecting the shafts around the friction clutch, in an intermediate gear ratio, a one way roller clutch in the gear train, a movable member for moving the one way clutch rollers to an inoperative position for either direction of rotation when the weights are depressed, additional centrifugal weights mounted on the clutch for controlling the same, a low speed gear train for connecting the shafts around the friction clutch, and cam means responsive to relative rotation between the intermediate gear train and the driven shaft for depressing all of the weights when the low speed gear is in driving operation.

10. An automatic transmission comprising a driving shaft, a driven shaft, a friction clutch having driving and driven members for connecting the shafts in a high speed ratio, a pressure plate contacting the clutch members, centrifugal weights for urging the pressure plate against the clutch members, spring means interposed between the weights and pressure plate, a pair of relatively rotatable and axially movable cam members operatively connected with the driving and driven shafts one of said cam members being operatively connected with the pressure plate and arranged to move the pressure plate away from the members, when the driving shaft overruns the driven shaft, a gear train for connecting the shafts around the friction clutch, in an intermediate gear ratio, a one way roller clutch in the gear train, a movable member for moving the one way clutch rollers to an inoperative position for either direction of rotation when the weights are depressed, additional centrifugal weights mounted on the clutch for controlling the same, a low speed gear train for connecting the shafts around the friction clutch, cam means responsive to relative rotation between the intermediate gear train and the driven shaft and means projecting through the intermediate overrunning clutch hub, said means being movable by the last named cam means to depress all the weights when the low speed gear train is in driving operation.

11. An automatic variable speed transmission comprising a driving shaft, a driven shaft, a friction clutch having driving and driven members for connecting the shafts in a high speed ratio, a gear train having an overrunning clutch for connecting the shafts in a lower gear ratio, and relatively rotatable clutch controlling members connected with the driving and driven shafts respectively and operable upon the clutch by relative rotation of the driving and driven shafts in one direction to positively disengage the friction clutch and operable upon rotation in the opposite direction to permit engagement of the friction clutch, said clutch controlling members being freely rotatable relatively to each other upon clutch disengagement.

12. An automatic variable speed transmission comprising a driving shaft, a driven shaft, a friction clutch having driving and driven members for connecting the shafts in a high speed ratio, a gear train having an overrunning clutch for connecting the shafts in an intermediate gear ratio, means operable upon relative rotation of the driving and driven shafts in one direction to positively disengage the friction clutch and operable upon rotation in the opposite direction to permit engagement of the friction clutch, a gear train having an overrunning clutch for connecting the shafts around the friction clutch in a low speed ratio, and means operable upon relative rotation of the low and intermediate gear trains for moving the intermediate speed gear overrunning clutch to an inoperative position for forward driving when the low speed gear is in driving operation.

13. An automatic variable speed transmission comprising a driving shaft, a driven shaft, a friction clutch having driving and driven members for connecting the shafts in a high speed gear ratio, means for connecting the shafts in a lower speed ratio when the clutch is disengaged, means including a pressure plate for engaging the members, a cam member operatively connected with one of said shafts, a second cam member movable by the first cam member and frictionally connected to the other shaft and said second cam member being cooperative with the pressure plate and arranged to move the pressure plate away from the clutch members upon relative rotation of the cam members.

14. An automatic variable speed transmission comprising a driving shaft, a driven shaft, a friction clutch having driving and driven members for connecting the shafts in a high speed gear ratio, means for connecting the shafts in a lower speed ratio when the clutch is disengaged, means including a pressure plate for engaging the members, a cam member operatively connected with one of said shafts, a second cam member movable by the first cam member and frictionally connected to the other shaft, said second cam member being cooperative with the pressure plate and arranged to move the pressure plate away from the clutch members upon relative rotation of the cam members and means for moving both cam members and the pressure plate to disengage the clutch.

15. An automatic variable speed transmission comprising a driving shaft, a driven shaft, a friction clutch having driving and driven members for connecting the shafts in a high speed gear ratio, means for connecting the shafts in a lower gear ratio when the clutch is disengaged, means including a pressure plate for engaging the members, springs for urging the pressure plate toward the members, centrifugal weights acting through the springs to urge the pressure plate toward the members, a cam member operatively connected with one of said shafts, a second cam member movable by the first cam member and frictionally connected to the other shaft, and said second cam member being operatively connected with the pressure plate and arranged to move the pressure plate toward the weights and against the force of the springs upon relative rotation of the cam members.

16. An automatic variable speed transmission comprising a driving shaft, a driven shaft, a friction clutch having driving and driven members for connecting the shafts in a high speed gear ratio, means for connecting the shafts in a lower gear ratio when the clutch is disengaged, means including a pressure plate for engaging the members, springs for urging the pressure plate toward the members, centrifugal weights acting through the springs to urge the pressure plate toward the members, a cam member operatively connected with one of said shafts, a second cam movable by the first cam member and member frictionally connected to the other shaft, said second cam member being operatively connected with the pressure plate and arranged to move the pressure plate toward the weights and against the force of the springs upon relative rotation of the cam members and manually operable means for bodily moving both cam members and the pressure plate toward the weights.

17. An automatic variable speed transmission comprising a driving shaft, a driven shaft, a friction clutch having driving and driven members for connecting the shafts in a high gear ratio, a gear train including an overrunning device for connecting the shafts in a lower speed ratio, centrifugal weights for controlling the clutch, a movable pressure plate adjacent the members, centrifugal weights for moving the pressure plate toward the members, springs interposed between the weights and the pressure plate for transmitting the force of the weights, a movable contacting plate between the springs and the weights, a cam member operatively connected to the driven shaft, a second cam member frictionally movable by the first cam member and connected to the driving shaft, and said second cam member being operatively connected with the pressure plate and arranged to move the pressure plate toward the weights upon relative rotation of the cam members.

18. An automatic variable speed transmission comprising a driving shaft, a driven shaft, a friction clutch having driving and driven members for connecting the shafts in a high gear ratio, a gear train including an overrunning device for connecting the shafts in a lower speed ratio, centrifugal weights for controlling the clutch, a movable pressure plate adjacent the members, centrifugal weights for moving the pressure plate toward the members, springs interposed between the weights and the pressure plate for transmitting the force of the weights, a movable contacting plate between the springs and the weights, a cam member operatively connected to the driven shaft, and a second cam member movable by the first cam member and frictionally connected to the driving shaft, said second cam member being operatively connected with the plate and arranged to move the pressure plate toward the weights upon relative rotation of the cam members and manually operable means rotatable with the driving shaft for moving both cam members and the pressure plate to reduce the pressure upon the clutch members.

19. An automatic variable speed transmission for an engine driven vehicle, comprising a driving shaft, a driven shaft, a friction clutch having friction members for connecting the shafts in a high speed ratio, a pressure plate for engaging the members, means for connecting the shafts around the clutch when the clutch is disengaged, means for applying pressure to the clutch members, cooperative cam members associated with the driving and driven shafts respectively, one of said cam members being operatively connected with the plate for disengaging the clutch upon relative rotation of the cam members, a control for the vehicle engine, and means operable by the engine control for relieving pressure upon the clutch members to initiate relative rotation of the cam members.

20. An automatic transmission for an engine driven vehicle comprising a driving shaft, a driven shaft, a friction clutch having driving and driven members for connecting the shafts in a high speed ratio, means for applying pressure to the clutch members, means for connecting the shafts in a lower speed ratio when the clutch is disengaged, a cam member driven by one of said shafts, a cooperative cam member frictionally driven by the other shaft, means operable by the cam members and cooperative with the clutch pressure applying means to disengage the cam upon relative rotation of the clutch members, a throttle control for the vehicle engine, and means operable by the engine control for moving both cam members to relieve clutch member pressure as the control is moved to open the throttle.

ROMEO M. NARDONE.